United States Patent
Murugan et al.

(10) Patent No.: US 6,391,995 B2
(45) Date of Patent: May 21, 2002

(54) POLYMER COMPOSITIONS USEFUL AS DYE COMPLEXING AGENTS, AND PROCESSES FOR PREPARING SAME

(75) Inventors: Ramiah Murugan, Indianapolis; Eric F. V. Scriven, Trafalgar; James R. Stout, Brownsburg; Stephanie Syler Metrick, Indianapolis, all of IN (US)

(73) Assignee: Reilly Industries, Inc., Indianapolis, IN (US)

( * ) Notice: Subject to any disclaimer, the term of this patent is extended or adjusted under 35 U.S.C. 154(b) by 0 days.

(21) Appl. No.: 09/781,095

(22) Filed: Feb. 9, 2001

Related U.S. Application Data

(60) Provisional application No. 60/181,298, filed on Feb. 9, 2000.

(51) Int. Cl.$^7$ ............................................. C08F 126/06
(52) U.S. Cl. .................... 526/265; 526/526; 526/218.1; 526/219; 526/258; 526/310
(58) Field of Search .............................. 526/218.1, 219, 526/258, 265, 310

(56) References Cited

U.S. PATENT DOCUMENTS

| | | | |
|---|---|---|---|
| 5,627,151 A | 5/1997 | Detering et al. | 510/475 |
| 5,710,119 A | 1/1998 | Busch et al. | 510/360 |
| 5,861,230 A | 1/1999 | Lambert et al. | 430/202 |
| 5,929,175 A | 7/1999 | Shih et al. | 525/359.3 |
| 5,942,335 A | 8/1999 | Chen et al. | 428/500 |
| 5,962,613 A | 10/1999 | Schade et al. | 526/258 |
| 6,011,096 A | 1/2000 | Shih et al | 524/99 |

OTHER PUBLICATIONS

Thurmond et al., J. Am Chem. Soc. (1997), 119 (28), 6656–6665.*
Thurmond et al., Polym. Prepr. (Am. Chem. Soc., Div. Polym. Chem.) (1997), 38(2), 592–593.*
A New Type of Polyampholyte: Poly(4–vinyl Pyridine Betaine), *Journal of Polymer Science*, 26:251–254 (1957).
Dupont Vazo Free Radical Initiators, www.dupont.com, 4 pgs. (Jan. 28, 2000).
Enzymatic inhibition of dye transfer, *Inform*, vol. 8, No. 9, pp. 950, 952–954, 956–957 (Sep. 1997).
Wako Azo Polymerization Initiators, C&EN, 40 (Jul. 26, 1999).

* cited by examiner

*Primary Examiner*—Helen L. Pezzuto
(74) *Attorney, Agent, or Firm*—Woodard, Emhardt, Naughton, Moriarty & McNett

(57) ABSTRACT

Described are preferred processes for preparing quaternary amine polymers of good color, comprising preparing a free base amine polymer by polymerizing a free base amine monomer in the presence of a water-soluble azo initiator, and subjecting the resultant polymer to quaternization conditions. Also described are unique, water-soluble quaternary amine polymers obtainable by such processes, and dye complexing polymer blends useful in the manufacture of detergents.

21 Claims, No Drawings

POLYMER COMPOSITIONS USEFUL AS DYE COMPLEXING AGENTS, AND PROCESSES FOR PREPARING SAME

CROSS-REFERENCE TO RELATED APPLICATIONS

This application claims the benefit of U.S. Provisional Patent Application Ser. No. 60/181,298 filed Feb. 9, 2000, which is hereby incorporated herein by reference in its entirety.

BACKGROUND OF THE INVENTION

The present invention relates generally to polymer compositions and processes for their preparation, and in particular to nitrogenous polymer compositions which are useful as dye complexing agents, and to processes for their preparation.

Manufacturers of detergents and other compositions useful in laundering dyed textiles have long sought ways to address the problem of dye transfer from one article to another. One solution which has become particularly popular is to include a polymer that interacts with dyes in solution and thus reduces or eliminates the transfer of dyes from one article to another. The largest class of polymers useful as dye transfer inhibition (DTI) agents includes nitrogen-containing polymers such as poly(vinylpyrrolidone), poly(vinylimidazole), and poly(vinylpyridine)-based polymers such as poly(vinylpyridin-N-oxide) and quaternary salt forms of polyvinylpyridine polymers. As examples, U.S. Pat. No. 5,627,151 describes the use of certain copolymers including 1-vinylpyrrolidone or 1-vinylimidazole or mixtures thereof with certain other nitrogen-containing, basic ethylenically unsaturated monomers, as detergent additives. U.S. Pat. No. 5,710,119 describes the use of a copolymer of N-vinylimidazole and N-vinylpyrrolidone in a detergent composition, and U.S. Pat. No. 5,929,175 describes the use of certain water soluble poly(vinylpyridine betaines) containing a quaternary nitrogen and a carboxylate salt, as dye complexing polymers.

For most applications, the color of polymeric DTI agents is of particular importance. Highly colored materials are generally undesirable, and there is a demand in industry for low-colored polymeric Dn agents. However, the processes by which polymeric DTI agents are prepared can often impart substantial dark color to the polymers. While some of this color may be eliminated by bleaching or similar measures, such measures both present a risk to damaging the desired polymers and increase the cost of the overall manufacturing process. Particularly in the case of forming quaternary salt polymers by quaternization of a corresponding free base nitrogenous polymer, the quaternization step is known to impart significant color to the final product.

Another issue that arises in the area of DTI agents is the action of the agents to actively promote dye loss from dyed fabrics. Thus, some efforts have been made to derive copolymers which have a moderated tendency to attack and cause undesired dye loss from fabrics.

In view of this background, there remain needs for new polymer compositions useful as DTI agents, and for processes for preparing them. Desirably, processes for preparing DTI polymers would be relatively facile to conduct while providing end products of good color. Also, DTI polymer compositions having a relatively high ability to inhibit dye transfer and a relatively low tendency to cause dye loss are desired. The present invention addresses these needs.

SUMMARY OF THE INVENTION

Accordingly, in one preferred aspect, the present invention provides a process for preparing a polyvinylpyridine quaternary polymer, the process comprising polymerizing a vinylpyridine monomer in the presence of an azo initiator, to form a polyvinylpyridine polymer having a weight average molecular weight of about 2,000 to about 1,000,000. The process also includes the step of quatermizing said vinylpyridine polymer so as to form a polyvinylpyridine quaternary polymer. Inventive detergent compositions and methods of their use are provided, which include polymers so prepared functioning as dye transfer inhibition agents.

In another preferred embodiment, the invention provides a polymer composition, comprising a water-soluble polyvinylpyridine polymer, the polymer having at least one terminal group having the formula

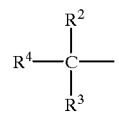

wherein $R^2$ and $R^3$ are, independently, alkyl with 1 to 3 carbons or cyano, and $R^4$ is a group of the formula

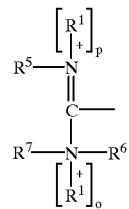

wherein $R^5$ and $R^6$ are H or alkyl and can together form a ring, $R^1$ is an organic radical having up to about 20 carbon atoms, and $R^7$ is H or $R^1$ as defined above, and o and p are 0 or 1, or of the formula:

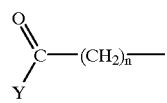

wherein n is an integer from 0 to 5, Y is OH or a group of the formula:

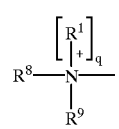

wherein q is 0 or 1, $R^8$ and $R^9$ are H, alkyl or hydroxyalkyl, and $R^1$ is as defined above.

Another preferred embodiment of the present invention provides a water-soluble polyvinylpyridine quaternary polymer obtainable by a process comprising polymerizing a vinylpyridine monomer in the presence of an azo initiator to form a vinylpyridine polymer, and quaternizing the vinylpyridine polymer.

A still further preferred embodiment of the invention provides a polymer composition that includes a mixture of a first polymeric amine dye transfer agent and a second polymeric amine dye transfer agent. Particularly preferred are compositions wherein the first polymeric amine dye transfer agent is a polyvinylpyridine N-oxide polymer.

Yet other embodiments of the present invention provide detergent compositions including polymer compositions of the invention, and methods for washing dyed textiles which comprise contacting the textiles with a detergent composition of the invention.

Additional embodiments, as well as features and advantages of the invention, will be apparent from the descriptions herein.

DESCRIPTION OF THE PREFERRED EMBODIMENT

For the purposes of promoting an understanding of the principles of the invention, reference will now be made to certain of its embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, the present invention provides processes for preparing nitrogenous polymers, novel polymer compositions obtainable by the processes, novel polymeric admixtures, and novel detergent compositions and textile laundering methods.

Turning now to a discussion of inventive processes, such processes involve reacting one or more nitrogenous, free base monomers, in particular vinylpyridine monomers, in the presence of a water-soluble azo compound initiator, and then reacting the resulting polymer to functionalize, for example quaternize, nitrogen groups in the polymer. Processes of the invention have been found to be capable of yielding unique polymers having improved color as compared to polymers prepared using other initiators.

The polymerization step in processes of the invention is desirably conducted in an organic or organic/aqueous solvent in the presence of the water-soluble azo initiator. The solvent preferably includes a polar organic solvent such as an alcohol which solubilizes the monomer and product polymer in the reaction system.

Preferred polymerizable monomers for use in the invention are ethylenically unsaturated nitrogenous monomers, especially vinylpyridine monomers. Preferred vinylpyridine monomers include 2-and 4-vinylpyridine monomers, although other vinylpyridine monomers, for example 3-vinylpyridine monomers, are suitable. Vinylpyridine monomers for use in the invention can be obtained commercially or can be synthesized by techniques known to the art and literature. The vinylpyridine monomers can be non-substituted or substituted (i.e. on the pyridine ring) with one, two, three or four groups which do not detrimentally interfere with the polymerization reaction, especially lower alkyl groups such as $C_1$ to $C_6$ alkyls, i.e. methyl, ethyl, propyl, butyl, heptyl and hexyl substituents (see, e.g., Decout, J. L. et al., J. Prelim. Sci. Prelim. Chem. Ed., 18, 2391 (1980)). More preferred vinypyridine monomers are non-substituted 2- and 4-vinylpyridine monomers, for example as can be obtained from Reilly Industries, Inc., of Indianapolis, Ind., U.S.A. Although not necessary for the present invention, it is of course preferred that the vinylpyridine monomer(s) used be of high purity, for example 90% to 95% or more pure.

Preferred, free base form linear polyvinylpyridines produced in accordance with the invention will comprise repeating units of the formula:

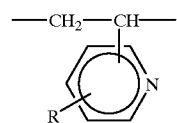

wherein R is H or a non-interfering substituent, for example a hydrocarbon substituent having from 1 to about 10 carbon atoms, more typically from 1 to about 6 carbon atoms. When present, preferred hydrocarbon substituents R are alkyl groups, especially methyl or ethyl groups.

In most preferred embodiments of the invention, R is H, for example as occurs in the case of polymers containing repeating units derived from 2-vinylpyridine and/or 4-vinylpyridine.

A particularly preferred group of polymers includes repeating units derived from a 4-vinylpyridine monomer, e.g. having the formula:

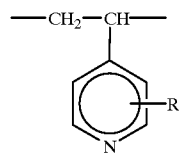

wherein R is as defined above.

The amount of azo initiator to use will depend upon many factors including for example the desired molecular weight of the product polymers, the particular reactants and solvent systems employed, as well as their relative amounts (i.e. the concentration level of the reaction), and given the teachings herein will be readily determinable by the ordinarily skilled artisan. In general, the amount of azo initiator utilized will be about 0.05 mol % to about 10 mol % relative to the monomers to be polymerized. More preferably, this amount will be about 1 mol % to 6 mol % relative to the monomers.

Particularly preferred, water-soluble azo initiators for use in the invention are encompassed by the formula:

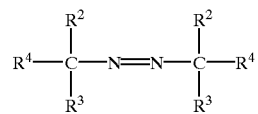

wherein $R^2$ and $R^3$ are, independently, alkyl with 1 to 3 carbons or cyano, and $R^4$ is a group of the formula

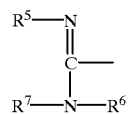

wherein $R^5$, $R^6$ and $R^7$ are H or alkyl, and $R^5$ and $R^6$ can together form a ring, especially an imidazole ring, or $R^4$ is a group of the formula

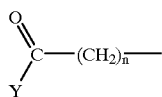

wherein n is an integer from 0 to 5, and Y is OH or a group of the formula:

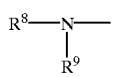

wherein $R^8$ and $R^9$ are H, alkyl or hydroxyalkyl; or a salt thereof, for example a dihydrohalide salt such as a dihydrochloride salt (·2HCl). Particularly preferred azo initiators include 2-2'-azobis(2-methylpropionamidine) dihydrochloride; 4-4'-azobis(4-cyanovaleric) acid; 2-2'azobis[2-methyl-N-(2-hydroxyethyl)propionamide]; and 2-2'-azobis[2-(2-imidazolin-2-yl)propane] dihydrochloride. These and other initiators can of course be used individually or in combination with other initiators.

In preferred processes of the invention, the polymerization parameters will be controlled to provide polyvinylpyridines having polystyrene equivalent $M_W$'s up to about 1,000,000, more preferably up to about 200,000, and most preferably about 2,000 to about 100,000.

Processes of the invention can be carried out to form linear homopolymers or copolymers, or crosslinked copolymers. Linear polymers are preferred, and when crosslinking is introduced it is preferably light crosslinking so as to maintain the water solubility or water dispersibility of the end product, functionalized (e.g. quaternary salt form) polymer. Suitable comonomers for polymerization along with the vinylpyridine monomer(s) include, for example, ethylenically unsaturated hydrocarbon monomers such as styrene, as well as ethylenically unsaturated nitrogenous monomers such as acrylamide, N-vinylpyrrolidone, and the like. Suitable crosslinking agents include, for example, di-ethylenically unsaturated hydrocarbon monomers such as divinylbenzene, as well as others such as polyfunctional acrylate or acrylamide monomers.

Preferred processes are conducted at reaction concentration levels (i.e. (monomer weight)/(monomer weight+ solvent weight)) of about 5% to about 50%. More preferably, the reaction concentration will be about 20% to 40%.

The solvent system used can vary widely so long as the system provides an environment in which the polymerization proceeds to yield the desired polymer. Generally at least one organic solvent will be used. The polymerization reactions of the invention can be solution polymerizations (i.e. the solvent system maintains the monomer(s) and product polymers in solution) or heterogeneous (i.e. the monomer(s) and/or product polymers do not remain in solution). In one preferred aspect of the invention, solvent system will maintain the monomer(s) and polymer product in solution.

Suitable such solvents include, for example, alcohols such as water-miscible mono- or polyhydric aliphatic alcohols, generally having up to about 15 carbon atoms, especially lower alcohols (i.e. $C_1$ to $C_5$ alcohols such as methanol, ethanol, propanol, butanol, and pentanol (these including both branched and unbranched forms, e.g. n-, i- or t- forms of these alcohols); ketones, for example those having from 2 to about 10 carbon atoms, e.g. dimethyl ketone, methyl ethyl ketone, and the like; esters, for example having from 2 to about 10 carbon atoms; amides, typically having from 1 to about 10 carbon atoms, such as formamide; sulfoxides, e.g. having from 2 to about 10 carbon atoms, for instance dialkylsulfoxides such as dimethylsulfoxide. Generally, low-boiling solvents, for example boiling at temperatures of about 120° C. or below, are preferred since they are more readily removed from reaction products by vacuum distillation. Also, alcohols are preferred co-solvents, especially lower alcohols such as $C_1$ to $C_4$ alcohols, most preferably methanol, ethanol, n-propanol, i-propanol, n-butanol, t-butanol, and sec-butanol.

Particularly advantageous polymerization processes of the invention are conducted in a solvent system at least predominantly comprised (by volume) of a water-miscible solvent, with a minor amount of water added to enhance the solubility of the water-soluble azo initiator in the system. More preferably, the solvent will contain about 60% to 99% by volume of a water miscible organic solvent such as alcohol, and about 1% to about 40% by volume water, and most preferably about 80% to 99% water miscible organic solvent and 1% to 20% water.

Processes of the invention will be conducted at temperatures sufficient to achieve the desired polymerization of the monomer(s). Generally, the temperature of the polymerization will vary with many factors including the particular monomer or monomers employed. Generally, however, when using preferred low-boiling organic solvents in the solvent system, the polymerization will be conducted at the reflux temperature of the solvent system employed, for example at temperatures of at least about 30° C., more preferably in the range of about 30° C. to about 100° C.

Generally speaking, processes of the invention can be conducted at subatmospheric, atmospheric or superatmospheric pressures. Atmospheric pressures are conveniently employed and are preferred.

The azo initiator, reactants and solvents can be combined in any suitable manner to achieve the polymerization. The azo initiator can be added to the solvent/monomer mixture, the monomer may be added to the solvent/azo initiator mixture, or the azo initiator and monomer can be concurrently added to the solvent, or all can be charged to a reaction vessel concurrently. It is preferred to charge the azo initiator last, and then heat the reaction mixture to the desired temperature for the polymerization to occur. It is also preferred to feed an inert gas such as nitrogen subsurface in the monomer/solvent mixture prior to the addition of azo initiator. In addition, in preferred processes, an inert gas such as nitrogen is used to blanket the vapor space above the liquid reaction mixture during the polymerization reaction.

The polymerization reaction will be continued for sufficient period of time to achieve substantial conversion of the monomer(s) to the polymer product. The duration of the polymerization reaction required to achieve the conversion will depend upon several factors including the amount of initiator employed and the amounts and types of solvents and reactants employed. Typically, however, the polymerization reactions will be carried out over periods of up to about 24 hours, more typically about ½ to about 10 hours.

Preferred polymer compositions of the invention will have polydispersities (defined as the weight average molecular weight of the polymer divided by the number average molecular weight of the polymer, $M_w/M_n$) in the range of about 1 to 10 and more preferably in the range of about 1 to 3. Polymers prepared as described have excellent color, typically having at most a light color, as opposed to a dark rust color which occurs when conventional organic-soluble azo catalysts are employed. Preferred polymers will have an APHA color of less than about 20, more preferably less than about 15, although it will be understood that this is not necessary to the broader aspects of the present invention.

After the polymerization reaction is completed, the polymer, containing free base form nitrogens, can be conventionally isolated if desired. For example, the solvent(s) can be removed by vacuum distillation, or the reacted medium can be contacted by a precipitation solvent in which the polymer is insoluble but in which the remainder of the reaction components are soluble. The polymer can then be filtered from the precipitation solvent. The use of suitable recovery and isolation techniques for the formed polymer is well within the purview of one of ordinary skill in the art.

In more preferred processes, after formation of the free base nitrogenous polymer, the polymer is soluble in the polymerization solvent, and is functionalized without recovery from the solvent. For example, the polymer can be reacted with a quaternizing agent to quaternize the nitrogens present, or can be reacted with an oxidizing agent to oxidize the nitrogens to form amine oxide functions. Functionalized polymers so prepared are desirably water-soluble or at least water-dispersable. It has been found that functionalized polymers so prepared have colors superior to polymers prepared using other initiators.

As used herein, the term functionalized includes both partially and substantially fully functionalized polymers. In most cases, polymers are desired in which at least about 10%, more preferably at least about 50% of the nitrogens present are functionalized. Quaternary salts can be prepared by reacting the nitrogenous polymers with organic compounds L-$R^1$ wherein L is a leaving group of a strength sufficient to quaternize the nitrogens, for example a halide, sulfonate or acrylate group. $R^1$ in quaternizing agents in accordance with the invention will usually be a $C_1$ to about $C_{15}$ organic group, and more typically a $C_1$ to about $C_{10}$ organic group. The organic group $R^1$ may contain one or more functional groups having at least one nitrogen, oxygen or sulfur atom, or a combination thereof. Particularly preferred are organic halides such as alkyl halides, hydroxyalkyl halides, or alkylene halides containing from 1 to about 6 carbons (e.g. allyl halide in the latter case); carbonyl-containing organic halides such as those of the formula X—$(CH_2)_n$—COO—+M or X—$(CH_2)_n$—COOZ wherein X is a halogen atom, M is a metal cation such as an alkali metal cation, especially sodium, Z is H, a $C_1$ to $C_6$ alkyl, or —$NR^{10}R^{11}$ wherein $R^{10}$ and $R^{11}$ are H or a $C_1$ to $C_6$ alkyl, and n is an integer from 1 to about 10; epoxides of the formula

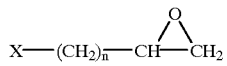

wherein X is a halogen atom and n is an integer from 1 to about 10. In these formulas, n is especially from 1 to about 5. The epoxy function of such quaternizing agents can survive quaternization conditions, but under acidic conditions will typically undergo acid-catalyzed cleavage resulting in hydroxyalkyl groups also substituted with another function characteristic of the cleavage, for example halo such as chloro or bromo when the quaternization is conducted in the presence of a hydrogen halide such as hydrogen chloride or hydrogen bromide, or an organic ester group —O—$R^{12}$ when appropriate acidic conditions are used in the presence of an alcohol, $R^{12}$ in this case typically being an alkyl group having from 1 to about 6 carbon atoms, derived from the corresponding alcohol. Illustratively, epichlorohydrin is one preferred quaternizing agent of the invention, undergoing cleavage during the quaternization to provide quaternizing groups $R^1$ of the formula —$CH_2$—CHOH—$CH_2Cl$. Additional preferred quaternizing agents include methyl chloroacetate, chloroacetamide, and the like. The linear polyvinylpyridines can also be converted to their N-oxide forms by conventional procedures, for instance by reaction with peroxides in the presence of acetic acid.

Preferred functionalized polymers of the invention will have repeating units comprising amine oxide or quaternary nitrogen functional groups, and at least one end group of the formula

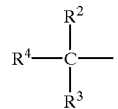

wherein $R^2$ and $R^3$ are, independently, alkyl with 1 to 3 carbons, especially methyl, or cyano (—CN), and $R^4$ is a group of the formula

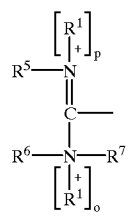

wherein $R^5$ and $R^6$ are H or alkyl and can together form a ring, $R^1$ is as defined above, and $R^7$ is H or $R^1$ as defined above, and o and p are 0 or 1. $R^7$ will be $R^1$ when the quaternization conditions are sufficient to substitute the group $R^1$ of the quaternizing agent for the hydrogen originally present, and will be H when they are not. Similarly, the variables o and p will be 1 when the quaternization agent and conditions are sufficient to quaternize their respective nitrogens, and will be 0 when they are not. It will be understood, in this regard, that the variables p and o are independent of one another, and that both may be 0 or 1, or p may be 0 when o is 1, or vice versa.

$R^4$ may also be a group of the formula

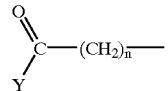

wherein n is an integer from 0 to 5, Y is OH or a group of the formula:

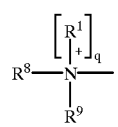

wherein q is 0 or 1, $R^8$ and $R^9$ are H, alkyl or hydroxyalkyl, and $R^1$ is as defined above.

One such terminal group will be present as a result of the initiation of the polymer chain with the preferred azo compound initiator. Whether more than one such terminal group is present will depend upon the agent which terminates polymerization, i.e. whether it is derived from the azo initiator or some other agent, for example water or alcohol. Thus, in a linear polymer, two such end groups may be present, and in a crosslinked polymer, even more may be present. In addition, the quaternized or unquaternized state of the end group will depend upon the particular quaternization technique employed to convert the free base polymer to the quaternary form. However, it is expected in most instances that the quaternization reaction will result in at least some quaternization of the terminal group, due to the basic character of the nitrogen or nitrogens in the group.

Such polymers having pyridine N-oxide or quaternized pyridine repeating units are more preferred, illustratively having one or more terminal groups as specified above, along with repeating units of the formula

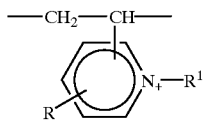

wherein R and $R^1$ are as defined above. Thus, preferred groups $R^1$ include:

alkyl, hydroxyalkyl, or alkylene groups containing from 1 to about 6 carbon atoms;

—$(CH_2)_n$—COO—+M or —$(CH_2)_n$—COOZ wherein M is a metal cation such as an alkali metal cation, especially sodium, Z is H, a $C_1$ to $C_6$ alky, or —$NR^{10}R^{11}$ wherein $R^{10}$ and $R^{11}$ are H or a $C_1$ to $C_6$ alkyl, and n is an integer from 1 to about 10;

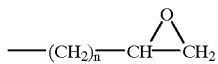

wherein n is an integer from 1 to about 10, especially 1 to about 5;

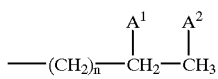

wherein n is an integer from to about 10, especially 1 to about 5, at least one of $A^1$ and $A^2$ is hydroxyl, and the other is an organic or inorganic functional group (e.g. resulting from cleavage of the epoxide above), typically a halo- such as bromo or chloro, or a group —O—$R^{12}$ wherein $R^{12}$ is as defined above.

As will be understood, the cationic functions of such repeating units, and of the terminal groups, will usually be coordinated with an anion $A^-$, for example a monvalent anion such as a halogen anion, for example a chlorine, bromine or iodine anion, or a sulfur-containing anion such as sulfate, although other anions may be introduced during the quaternization, or introduced by subsequent ion exchange. Cationic functions of such repeating units may also be coordinated with anionic functions of the repeating units, forming so-called internal salts, or betaines.

A preferred group of polymers will have quaternized 4-vinylpyridine repeating units of the formula:

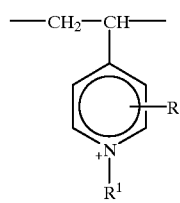

wherein R and $R^1$ are as defined above.

The polymers of the invention may be used, for example, as additives to detergent compositions, fabric softeners, or the like. In this regard, the polymers of the invention will act as DTI's, thus inhibiting color transfer between textiles. The detergents can be in powder form or in liquid form. The detergent and cleaner composition may vary widely. Detergent and cleaner formulations normally contain from 2 to 50% by weight of surfactants, with or without builders. These data apply both to liquid and to powder detergents. Detergent and cleaner formulations commonly used in Europe, the USA and Japan are tabulated, for example, in Chemical and Engn. News, 67 (1989) 35. Further details of the composition of detergents and cleaners are to be found in Ullmanns Enzyklopadie der technischen Chemie, Verlag Chemie, Weinheim 1983, 4th Edition, pages 63–160. The detergents may also contain a bleach, eg. sodium perborate or sodium percarbonate, which, when used, may be present in amounts of up to 30% by weight in the detergent formulation. The detergents or cleaners may contain further conventional additives, eg. complexing agents, opacifying agents, optical brighteners, enzymes, perfume oils, other color transfer inhibitors, antiredeposition agents, soil release polymers and/or bleach activators. They contain the copolymers. according to the invention in amounts of from 0.1 to 10, preferably 0.2 to 3, % by weight.

For additional information concerning detergent compositions and conventional ingredients thereof, reference may be made to U.S. Pat. Nos. 5,710,119, 5,929,175, 5,962,613 and 5,710,119, which are all hereby incorporated herein by reference in their entirety.

Polymers of the invention may also find use in pharmaceutical or cosmetic compositions, as adhesives, as additives in paper manufacture, for stabilizing enzymes or for adsorbing metal ions or acids.

In another aspect of the present invention, it has surprisingly been discovered that mixtures of polymeric Dn agents can be employed to advantage in the inhibition of dye transfer. In particular, it has been found that mixtures of nitrogenous, dye-complexing polymers can be used to provide high levels of dye transfer inhibition, while minimizing color loss from the dyed textile. As specific examples, two or more quaternary polymers having repeating units as described above may be blended with one another, or such polymers may be individually or in combination blended with another nitrogenous polymer such as an amine oxide polymer, e.g. a polyvinylpyridine N-oxide polymer or copolymer, or a polyvinylpyrrolidone polymer or copolymer. Binary polymer blends may contain a weight ratio of the two polymers of about 10:90 to about 90:10, more preferably about 75:25 to about 25:75. The specific weight ratio employed will be determined based upon a balance of dye transfer inhibition properties and color loss properties, and other similar performance factors. Particularly preferred DTI polymer blends will include at least one water soluble polyvinylpyridine N-oxide polymer, especially a polymer derived from poly-4-vinylpyridine and/or poly-2- vinylpyridine, in combination with at least one other dye complexing nitrogenous polymer. Such other nitrogenous polymer may contain, for example, pendant quaternary groups as discussed above or otherwise, or pendant pyrrolidone groups, e.g. as occurs in polyvinylpyrrolidone polymers and copolymers.

In another feature of the invention, dye-complexing polymer blends of the invention will desirably include a dye-fastening complexing polymer which bonds to the textile (for example a polymer having a quaternizing group containing a displaceable halo or an epoxide function), and a solution-borne complexing polymer which does not bond to the textile and thus remains substantially in solution. In this fashion, the dye-fastening complexing polymer will facilitate dyefastness to the textile, complexing with debonded dye molecules before they are released to the bulk solution; on the other hand, the solution-borne polymer will serve as a DTI agent which complexes with and inhibits the transfer of dye molecules which reach the bulk solution. Preferred dye-fastening complexing polymers include water-soluble nitrogenous polymers, particularly water-soluble polyvinylpyridine quaternary salts such as those prepared using epoxide-containing quatermizing agents, e.g. epichlorohydrin. Preferred solution-borne DTI polymers including those containing amine oxide groups, such as polyvinylpyridine N-oxide homopolymers or copolymers, as well as other known polymeric DTI agents such as water-soluble polyvinylpyrrolidone homopolymers or copolymers, water-soluble polyvinylimdazole homopolymers or copolymers, and the like.

To promote a further understanding of the present invention and its features and advantages, the following specific examples are provided. It is to be understood that these examples are illustrative and not limiting in nature.

EXAMPLE 1

Polymerizations Using Azo Initiators

General Procedure

A 4-neck, round bottom flask is equipped with mechanical stirrer, condenser, and thermometer. The flask is charged with 1.43 moles of 4-vinylpyridine (4-VP) (alone or mixed with an equal portion of 2-vinylpyridine, 2-VP), and 400 mL isopropanol. The flask is purged with nitrogen gas for 0.5 hour. The initiator is made into a slurry with a minimal amount of water and added to the rbf. The solution is then heated to reflux. Conversion to polymer followed by nuclear magnetic resonance (NMR).

The above procedure was performed with each of the following water-soluble azo initiators, available from Wako Chemicals, Dallas, Tex., USA:

A. 2-2'-azobis(2-methylpropionamidine) dihydrochloride (Wako V-50)

B. 4-4'-azobis(4-cyanovaleric) acid (Wako V-501)

C. 2-2'azobis[2-methyl-N-(2-hydroxyethyl) propionamide] (Wako V-086)

D. 2-2'-azobis[2-(2-imidazolin-2-yl)propane] dihydrochloride (Wako VA-044)

A comparative procedure was also performed using hydrogen peroxide ($H_2O_2$) as the initiator. The results are set forth in Table 1.

TABLE 1

| Monomer(s) | Initiator[c] | mL water | Hrs @ reflux | % Conv. | MW | Mw/Mn | Color (APHA) |
|---|---|---|---|---|---|---|---|
| 4-VP | B | 25 | 4 | 100 | 21685 | 1.54 | 14 |
| 4-Vp | D | 25 | 4 | 100 | 22844 | 1.57 | 7 |
| 4-VP | C | 25 | 6 | 90 | 102260 | 1.42 | 22 |
| 4-VP | A | 25 | 4.5 | 100 | | | 9 |
| 4-VP | A | 50[a] | 24 | 100 | 19540 | 1.65 | 9 |
| 2-VP[b] 4-VP | A | 50[a] | 24 | 100 | 48266 | 1.95 | 10 |
| 4-VP | $H_2O_2$ | 25 | 18 | 63 | | | 29 |

[a]25 mL were added with the initiator at the beginning of the polymerization, and 25 mL were added after 4 hours at reflux.
[b]0.715 moles of each 4-VP and 2-VP were used.
[c]0.029 moles of initiators A–D were used and 0.059 moles of hydrogen peroxide was used.

As shown, vinylpyridine polymerizations initiated utilizing the azo initiators yielded polymer products of superior color. In addition, the reactions with the azo initiators proceeded rapidly, achieving high conversion (90–100%) over several hours of reacting. Also of note are the superior results achieved utilizing initiators D and A, yielding polymers having APHA colors less than about 10.

EXAMPLE 2

Preparation of Derivatives of Polyvinylpyridines

Polyvinylpyridines prepared as described in Example 1 above were converted to quaternary salt forms. In particular, quaternary salts were prepared from polyvinylpyridine polymers prepared using 2-2'-azobis(2-methylpropionamidine) dihydrochloride (Wako V-50) and hydrogen peroxide (comparative). The quaternizing agents employed were:

Allyl Chloride

Chloroethanol

Chloroacetamide

Ethylchloroacetate

Methylchloroacetate

Epichlorohydrin

Methyl chloride

To prepare the sodium chloroacetate quat, the polyvinylpyridine was quaternized with sodium monochloroacetate (SMCA). Sodium chloroacetate (1.1 eq.) was added at ambient temperature and stirred for 1 hour. The solution was then stirred at 70+/−5° C. for 1 hour. Conversion followed by NMR. A general procedure was used to prepare the remainder of the quat forms, as follows: Quaternizing agent (1 equivalent) was added to the polyvinylpyridine solution resultant of the polymerization in Example 1. For each mole of polyvinylpyridine present in the solution, 100 mL of water was added after the addition of the quaternizing agent (i.e., if there were 0.5 mol PVP present in solution, then 50 mL of water were added). The solution was heated to 70° C. Conversion to quat was followed by checking solubility in water, and finally by NMR.

Conversion to the quaternary salt form proceeded smoothly in all cases, with the quaternized products exhibiting water solubility, and excellent color.

EXAMPLE 3

Testing in Adjacent Staining Procedure

The effectiveness of several polymers as DTI additives in laundry detergent was assayed using a Tergotometer to simulate actual washing conditions. The test was carried out on a composition containing 0.56% on weight of fabric of the polymer, 1 g/L commercial laundry detergent, and 110 ppm 3:1 Ca:Mg for water hardness. The solution was diluted to 1-L with deionized water.

One white cotton swatch, bleached and desized, and one dyed -cotton swatch (Direct Red 80 or Direct Blue 1) was immersed in the test solution at 100° F. The solutions were agitated for 10 minutes in a Tergotometer. The cloths were then removed and excess water was squeezed out. The cloths were then rinsed in clean deionized water for 3 minutes at 100° F., squeezed again, and allowed to air dry. Reflectance measurements of the white swatches were taken on a colorimeter. The reflectance readings were recorded as ΔE, which is a composite of the degree of whiteness, redness and blueness indices in the dyed cloth. These readings were taken as a direct measure of the degree of dye deposition under the test washing conditions.

Reflectance measurements of the dyed swatches were also taken on a calorimeter. The reflectance readings were used to calculate percent color loss.

The results are shown in Table 2.

TABLE 2

| Quaternizing Agent | ΔE |
| --- | --- |
| Allyl chloride | 13.92 |
| Chloroethanol | 9.97 |
| Chloroacetamide | 13.16 |
| Ethyl chloroacetate | 8.03 |
| Epichlorohydrin | 20.25 |
| Methyl chloride | 13.83 |
| Sodium Chloroacetate | 4.16 |

Compared to the relevant control, these results demonstrate the ability of the agents to reduce dye transfer in this testing protocol.

EXAMPLE 4

The effectiveness of various mixtures of polymeric DTI agents was studied. Various polymeric DTI agents were used in conjunction with poly(4-vinylpyridine-N-oxide) at varying concentrations, and the combination tested for its ability to reduce the cross-staining to an undyed piece of cotton from direct dyed cotton, when washed together according to a standardized wash test (ISO 105:C06/C2). A copolymer of poly(4-vinylpyridine-N-oxide) and poly(4-vinylpyridine epichlorohydrin) quat was also assessed in the same test.

The compounds were added to the washing liquor before addition of the dyed and undyed cotton. Details of the various polymeric DTI agents used are shown in Table 3.

TABLE 3

| Composition | Abbreviation |
| --- | --- |
| Poly(4-vinylpyridine), chloroacetate quat | PVPCAQ |
| Poly(4-vinylpyridine) N-oxide | PVPNO |
| Poly(4-vinylpyridine-N-oxide), poly(4-vinylpyridine epichlorohydrin) copolymer, 50:50 | PVPNO/EQ |

Experimental

2% omf C I Direct Red 89 dyeings on cotton were prepared by the standard method as recommended by the dye manufacturers. The dyeings were given no further treatment.

A standard test formulation comprising of 4 g dm$^{-3}$ ECE phosphate detergent and 1 g dm$^{-3}$ sodium perborate tetrahydrate was used. 50 cm$^3$ of the liquor was added to stainless steel pots of 550 cm$^3$ capacity also containing 25 steel balls of 6 mm diameter.

The anti-redeposition agents were added to the wash liquor. In tests of mixtures, the chloracetate quat of poly(4-vinylpyridine) (PVPCAQ), and poly(4-vinylpyridine-N-oxide) (PVNO) were added in ratios of 2:1, 1:1 and 1:2, respectively. The total amount of agents added was with respect to the mass of dyed fibre being washed at 2.0% omf and 4.0% omf. Then, 10 cm×4 cm samples of direct dyed cotton, with an equal size undyed piece of cotton attached, were added to the wash pots and the pots sealed. The samples were washed in a Roaches Washtec wash fastness testing machine for 30 minutes at 60° C. At the end of washing the samples were rinsed thoroughly in cold water and dried in the open air.

The samples and adjacent were measured after washing using a Match-Rite spectrophotometer. The color strength of the dyeings (K/S) was determined as a function of reflectance (R) at the $\lambda_{max}$ of the dyeings using the Kubelka-Munk equation.

Any reduction in depth of shade ($L_c$) that occurred as a result of washing was calculated using conventional measures based upon the color strengths of the washed and unwashed dyeings.

Results and Discussion

The data for the samples is shown in Table 4, which shows the color loss of the samples after washing and the D/S value of the adjacents. All the agents were effective in reducing the staining of adjacent with respect to the standard (the adjacent of which had a K/S of 1.6), at all concentrations employed. It was observed that the prevention of staining to the adjacent fabric increased with increasing concentration of anti-redeposition agent added, for all agents used.

TABLE 4

Loss of color strength ($L_c$ (%)) and staining to adjacent after washing

| Agent | % omf | KS/(Dyeing) | $L_c$ (%) | K/S (adj.) |
| --- | --- | --- | --- | --- |
| PVPEQ | 2 | 11.61 | 25.9 | 0.37 |
|  | 4 | 11.43 | 27.1 | 0.18 |
| PVPNO | 2 | 11.43 | 27.1 | 0.19 |
|  | 4 | 10.33 | 34.1 | 0.10 |
| PVPEQ:PVPNO (2:1) | 2 | 11.91 | 24.1 | 0.25 |
|  | 4 | 10.90 | 30.5 | 0.15 |
| PVPEQ:PVPNO (1:1) | 2 | 11.97 | 23.6 | 0.21 |
|  | 4 | 10.95 | 30.1 | 0.14 |
| PVPEQ:PVPNO (1:2) | 2 | 12.04 | 23.2 | 0.17 |
|  | 4 | 11.04 | 29.6 | 0.11 |
| PVPNO/EQ | 2 | 12.57 | 19.8 | 0.95 |
| PVPNO/EQ | 4 | 11.97 | 23.6 | 0.54 |

As can be seen, all agents did function to reduce staining to the adjacent. However, the PVPNO/EQ copolymer did not perform well as an anti-redeposition agent. Additionally, when mixtures of PVPCAQ and PVPNO were applied, the staining to adjacent was less than that secured with PVPCAQ alone, and staining was further reduced with increasing application concentration of PVPNO. This was such that a 4% omf application of the 1:2 ratio had equal staining to 4% omf application of PVPNO alone.

To ascertain whether PVPNO was acting solely as the anti-redeposition agent in the mixtures (independent of PVPCAQ), the actual concentrations of PVPNO used in the mixtures (i.e. in 4% omf 2:1, PVPNO applied at 1.33% omf) were plotted on the same graph as the standard application concentrations secured in the previous study. It was observed that the staining to adjacent secured with PVPNO, when used in co-application with PVPCAQ, was lower than the singular application of PVPNO. The reduction in staining achieved with a 4% omf application of a 2:1 ratio, which includes 1.33% omf PVPNO, is superior to a 1.33% omf application of PVPNO alone. Thus, the level of reduction in staining is not solely attributable to the PVPNO present. Similar analysis revealed that the effects using the mixtures are not solely attributable to PVPCAQ.

When considering whether the addition of the DTI agent (s) expedited increased color loss from the dyed fiber, it was seen that in most cases an increase in color loss was observed. This is believed to be due to the action of the agents not only to scavenge vagrant dye but also to drive desorption of dye from fiber by ionic interaction. As the concentration of all agents applied increased, the total color loss also increased. However, the mixtures of DTI agents could be used to inhibit color transfer with high efficacy at low concentrations, and generally caused lower color loss than when PVPNO and PVPCAQ were used alone.

EXAMPLE 5

In this Example, additional polymeric DTI agents were tested in a fashion similar to that described in Example 4. The agents tested are summarized in Table 5.

TABLE 5

Agents

| Composition | Abbreviation |
|---|---|
| Poly-4-vinylpyridine N-oxide | PVPNO |
| Polyvinylpyrollidone | PVPYROL |
| Poly-4-vinylpyridine N-oxide (50–70% Oxidized) | PVPNO50–70 |
| Poly-4-vinylpyridine N-oxide/ Poly-4-vinylpyridine Epichlorohydrin quat, 75:25 Copolymer | PVPNO/PVPEQ (75:25) |
| Poly-4-vinylpyridine N-oxide/ Poly-4-vinylpyridine Chloroacetate quat, 50:50 | PVPNO/PVPCAQ (50:50) |
| Poly-4-vinylpyridine N-oxide/ Poly-4-vinylpyridine Chloroacetate quat, 25:75 | PVPNO/PVPCAQ (25:75) |
| Poly-4-vinylpyridine N-oxide/ Poly-4-vinylpyridine Chloroacetate quat, 75:25 | PVPNO/PVPCAQ (75:25) |
| Poly-4-vinylpyridine N-Oxide/ Polyvinylpyrrolidone Copolymer, 50:50 | PVPNO/PVPYROL (50:50) |
| Poly-4-vinylpyridine N-oxide/ Acrylamide Copolymer, 50:50 | PVPNO/AQ (50:50) |
| Poly-4-vinylpyridine N-oxide/ Poly-2-vinylpyridine N-oxide copolymer, 50:50 | 4PVPNO/2PVPNO (50:50) |
| Poly-4-vinylpyridine N-oxide/ Poly-2-vinylpyridine N-oxide copolymer, 75:25 | 4PVPNO/2PVPNO (75:25) |

2% omf C I Direct Red 89 dyeings on cotton were prepared by the standard method as recommended by the dye manufacturers. The dyeings were given no further treatment.

A standard test formulation comprising of 4 g dm$^{-3}$ ECE phosphate detergent and 1 g dm$^{-3}$ sodium perborate tetrahydrate was used. 50 cm$^3$ of the liquor was added to stainless steel pots of 550 cm$^3$ capacity also containing 25 steel balls of 6 mm diameter.

The anti-redeposition agents were added to the wash liquor at 2.0% omf. Then 10 cm×4 cm samples of direct dyed cotton, with an equal size undyed piece of cotton attached, were added to the wash pots and the pots sealed. The samples were washed in a Roaches Washtec wash fastness testing machine for 30 minutes at 60° C. At the end of washing the samples were rinsed thoroughly in cold water and dried in the open air.

The samples and adjacent were measured after washing using a Match-Rite spectrophotometer. The color strength of the dyeings (K/S) and reduction in depth of shade that occurred as a result of washing were determined as in Example 4.

The data for the samples is shown in Table 6, which shows the color loss of the samples after washing and the K/S value of the adjacents.

TABLE 6

Loss of color strength ($L_c$ (%)) and staining to adjacent after washing

| Agent | K/S (dyeing) | $L_c$ (%) | K/S (adjacent) |
|---|---|---|---|
| Polyvinylpyridine-N-oxide | 11.19 | 28.7 | 0.19 |
| Polyvinylpyrollidone | 11.22 | 28.5 | 0.62 |
| PVNO 50–70 | 11.61 | 25.9 | 0.43 |
| PVPNO/PVPEQ (75:25) | 10.84 | 30.9 | 0.70 |
| PVPNO/PVPCAQ (50:50) | 11.31 | 27.9 | 0.29 |
| PVPNO/PVPCAQ (25:75) | 11.61 | 25.9 | 0.42 |
| PVPNO/PVPCAQ (75:25) | 11.97 | 23.6 | 0.23 |
| PVPNO/PVPYROL (50:50) | 12.35 | 21.2 | 0.28 |
| PVPNO/PVPAQ (50:50) | 11.74 | 25.1 | 0.42 |
| 4PVPNO/2PVPNO (50:50) | 12.14 | 22.6 | 0.34 |
| 4PVPNO/2PVPNO (75:25) | 12.18 | 22.3 | 0.28 |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

All publications cited herein are indicative of the level of skill in the art and are hereby incorporated by reference as if each had been individually incorporated by reference and fully set forth.

What is claimed is:

1. A process for preparing a water-soluble polyvinylpyridine quaternary polymer, the process comprising:

polymerizing a vinylpyridine monomer in the presence of a water-soluble azo initiator, to form a polyvinylpyridine polymer having a weight average molecular weight of about 2,000 to about 1,000,000; and quaternizing said vinylpyridine polymer, so as to form a polyvinylpyridine quaternary polymer.

2. The process of claim 1 wherein said azo initiator is encompassed by the formula:

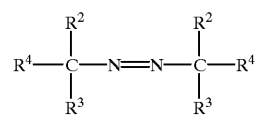

wherein $R^2$ and $R^3$ are, independently, alkyl with 1 to 3 carbons or cyano, and $R^4$ is a group of the formula

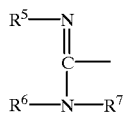

wherein R⁵, R⁶ and R⁷ are H or alkyl with 1 to 6 carbons and R⁵ and R⁶ can together form a ring, or R⁴ is a group of the formula

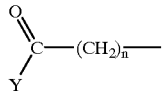

wherein n is an integer from 0 to 5, and Y is OH or a group of the formula:

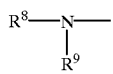

wherein R⁸ and R⁹ are H, alkyl with 1 to 6 carbons or hydroxyalkyl with 1 to 6 carbons; or a salt thereof.

3. The process of claim 2, wherein the azo initiator is selected from the group:
   2-2'-azobis(2-methylpropionamidine) dihydrochloride;
   4-4'-azobis(4-cyanovaleric) acid;
   2-2'azobis[2-methyl-N-(2-hydroxyethyl)propionamide]; and
   2-2'-azobis[2-(2-imidazolin-2-yl)propane] dihydrochloride.

4. The process of claim 2, wherein the azo initiator is 2-2'-azobis(2-methylpropionamidine) dihydrochloride.

5. The process of claim 1, wherein said polymerizing includes polymerizing 4-vinylpyridine, 2-vinylpyridine, or a mixture thereof.

6. The process of claim 1, wherein said polymerizing includes polymerizing 4-vinylpyridine.

7. The process of claim 1, wherein said polyvinylpyridine quaternary polymer is water soluble.

8. The process of claim 1, wherein said polyvinylpyridine quaternary polymer has repeating units of the formula:

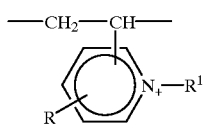

wherein R is C₁ to C₅ alkyl, and R¹ is an organic radical having up to about 15 carbon atoms.

9. The process of claim 8, wherein R¹ is selected from the group consisting of alkyl containing from 1 to 6 carbon atoms; alkylene containing from 1 to 6 carbon atoms; groups of the formula —(CH₂)ₙ—COO—⁺M or —(CH₂)ₙ—COOZ wherein n is an integer from 1 to 10, M is a metal cation, Z is H, an alkyl group containing from 1 to 6 carbon atoms, or —NR¹⁰R¹¹ wherein R¹⁰ and R¹¹ are H or an alkyl group containing from 1 to 6 carbon atoms; or a halo- and hydroxy-substituted alkyl group having from 1 to 6 carbon atoms.

10. A process for preparing a water-soluble polyvinylpyridine quaternary polymer, the process comprising:
providing a polyvinylpyridine polymer having a weight average molecular weight of about 2,000 to about 1,000,000, said polyvinylpyridine polymer having been prepared by polymerizing a vinylpyridine monomer in the presence of an azo intitiator; and quaternizing the polyvinylpyridine polymer to form a polyvinylpyridine quaternary polymer.

11. A polymer composition, comprising a water-soluble polyvinylpyridine polymer, the polymer having at least one terminal group having the formula

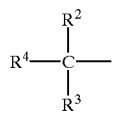

wherein R² and R³ are, independently, alkyl with 1 to 3 carbons or cyano, and R⁴ is a group of the formula

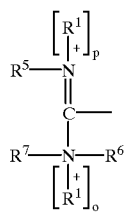

wherein R⁵ and R⁶ are H or alkyl and can together form a ring, R¹ is as defined above, and R⁷ is H or R¹ as defined above, and o and p are 0 or 1, or of the formula:

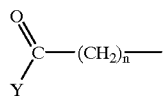

wherein n is an integer from 0 to 5, Y is OH or a group of the formula:

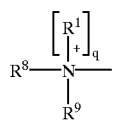

wherein q is 0 or 1, R⁸ and R⁹ are H, alkyl or hydroxyalkyl, and R¹ is as defined above.

12. A polymer composition, comprising a water-soluble polyvinylpyridine polymer obtainable by a process comprising polymerizing a vinylpyridine monomer in an aqueous medium in the presence of an azo initiator to form a vinylpyridine polymer, and quaternizing the vinylpyridine polymer.

13. A polymer composition, comprising a mixture including a first polymeric amine dye transfer agent and a second polymeric amine dye transfer agent.

14. The polymer composition of claim 13, wherein said first polymeric amine dye transfer agent is a polyvinylpyridine N-oxide polymer.

15. The polymer composition of claim 14, wherein said second polymeric amine dye transfer agent is a polyvinylpyridine quaternary polymer.

16. A detergent composition, comprising a polymer composition of claim 11.

17. A method for washing a dyed textile, comprising contacting the textile with an aqueous medium comprising a detergent composition of claim 16.

18. A process for preparing a free base polyvinylpyridine polymer, the process comprising:

polymerizing a vinylpyridine monomer to form a polyvinylpyridine polymer having a weight average molecular weight of about 2,000 to about 1,000,000, said polymerizing conducted homogeneously in a solvent containing a water-miscible organic solvent and in the presence of a water-soluble azo initiator having the formula:

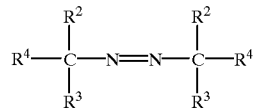

wherein $R^2$ and $R^3$ are, independently, alkyl with 1 to 3 carbons or cyano, and $R^4$ is a group of the formula

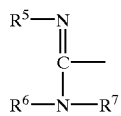

wherein $R^5$, $R^6$ and $R^7$ are H or alkyl and $R^5$ and $R^6$ can together form a ring, or $R^4$ is a group of the formula

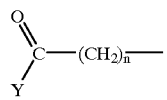

wherein n is an integer from 0 to 5, and Y is OH or a group of the formula:

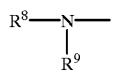

wherein $R^8$ and $R^9$ are H, alkyl or hydroxyalkyl, or a salt thereof.

19. The process of claim 8, wherein $R^1$ is a group selected from:

alkyl, hydroxyalkyl, or alkylene groups containing from 1 to about 6 carbon atoms;

—$(CH_2)_n$—COO$^-$+M or —$(CH_2)_n$—COOZ wherein M is a metal cation, Z is H, a $C_1$ to $C_6$ alkyl, or —NR$^{10}$R$^{11}$ wherein $R^{10}$ and $R^{11}$ are H or a $C_1$ to $C_6$ alkyl, and n is an integer from 1 to about 10;

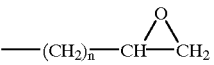

wherein n is an integer from 1 to about 10; and

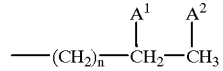

wherein n is an integer from to about 10, at least one of $A^1$ and $A^2$ is hydroxyl and the other is an organic or inorganic functional group.

20. A polymer composition of claim 11, which has repeating units of the formula:

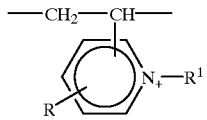

wherein R is $C_1$ to $C_5$ alkyl, and $R^1$ is an organic radical having up to about 15 carbon atoms.

21. A polymer composition of claim 20, wherein $R^1$ is a group selected from:

alkyl, hydroxyalkyl, or alkylene groups containing from 1 to about 6 carbon atoms;

—$(CH_2)_n$—COO$^-$+M or —$(CH_2)_n$—COOZ wherein M is a metal cation, Z is H, a $C_1$ to $C_6$ alkyl, or —NR$^{10}$R$^{11}$ wherein $R^{10}$ and $R^{11}$ are H or a $C_1$ to $C_6$ alkyl, and n is an integer from 1 to about 10;

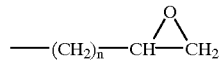

wherein n is an integer from 1 to about 10; and

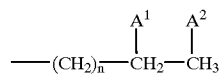

wherein n is an integer from to about 10, at least one of $A^1$ and $A^2$ is hydroxyl and the other is an organic or inorganic functional group.

* * * * *